United States Patent
Sykes

(10) Patent No.: US 10,291,463 B2
(45) Date of Patent: May 14, 2019

(54) LARGE-SCALE DISTRIBUTED CORRELATION

(71) Applicant: Riverbed Technology, Inc., San Francisco, CA (US)

(72) Inventor: Edward A. Sykes, Cary, NC (US)

(73) Assignee: Riverbed Technology, Inc., San Francisco, CA (US)

( * ) Notice: Subject to any disclaimer, the term of this patent is extended or adjusted under 35 U.S.C. 154(b) by 198 days.

(21) Appl. No.: 14/952,313

(22) Filed: Nov. 25, 2015

(65) Prior Publication Data

US 2017/0104658 A1    Apr. 13, 2017

Related U.S. Application Data

(60) Provisional application No. 62/238,218, filed on Oct. 7, 2015.

(51) Int. Cl.
*G06F 15/173*    (2006.01)
*H04L 12/24*    (2006.01)

(52) U.S. Cl.
CPC .......... *H04L 41/064* (2013.01); *H04L 41/044* (2013.01)

(58) Field of Classification Search
CPC ............................. H04L 41/64; H04L 41/044
USPC ................................................. 709/223, 224
See application file for complete search history.

(56) References Cited

U.S. PATENT DOCUMENTS

| | | | | |
|---|---|---|---|---|
| 6,012,152 A * | 1/2000 | Douik | ................. | G06F 11/0709 714/26 |
| 6,606,744 B1 * | 8/2003 | Mikurak | ................. | H04L 29/06 717/174 |
| 6,671,818 B1 * | 12/2003 | Mikurak | ................. | G06Q 10/06 714/4.21 |
| 6,947,376 B1 * | 9/2005 | Deng | ................. | H04L 41/0681 370/219 |
| 7,130,807 B1 * | 10/2006 | Mikurak | ................. | G06Q 10/06 705/7.25 |
| 7,490,073 B1 * | 2/2009 | Qureshi | ................. | G06F 11/079 706/50 |
| 7,600,007 B1 * | 10/2009 | Lewis | ................. | G06Q 10/04 709/223 |
| 8,086,708 B2 * | 12/2011 | Breitgand | ................. | H04L 41/00 709/223 |
| 8,200,527 B1 * | 6/2012 | Thompson | ........... | G06Q 10/0639 705/7.39 |
| 9,537,720 B1 * | 1/2017 | Baggott | ................. | H04L 41/12 |

(Continued)

*Primary Examiner* — Thu Ha T Nguyen
(74) *Attorney, Agent, or Firm* — Park, Vaughan, Fleming & Dowler LLP; Laxman Sahasrabuddhe

(57) ABSTRACT

Disclosed herein are system, method, and computer program product embodiments for performing distributed correlation to determine a probable cause for a performance problem detected in an application. An embodiment operates by triggering an alert for a performance metric of an application executing on a local-level node. The alert may be sent to a higher-level node. Upon receiving the alert, the higher-level node may send a distributed correlation request, used to determine a root cause of the alert, to the lower-level node. Upon receiving the distributed correlation request, the lower-level node may produce and send a correlation result to the higher-level node. Upon receiving the correlation result, the higher-level node may select the probable cause of triggering the alert based on the correlation result. The probable cause may then be presented to the user.

17 Claims, 7 Drawing Sheets

(56) References Cited

U.S. PATENT DOCUMENTS

| | | | | |
|---|---|---|---|---|
| 9,628,362 B2* | 4/2017 | Vasseur | ............... | H04L 41/16 |
| 10,037,232 B1* | 7/2018 | Garcia | ............... | G06F 9/544 |
| 10,084,672 B2* | 9/2018 | Hoja | ............... | H04L 43/04 |
| 2003/0097588 A1* | 5/2003 | Fischman | ............ | H04L 41/0213 |
| | | | | 726/25 |
| 2005/0228763 A1* | 10/2005 | Lewis | ............... | G06Q 10/06 |
| | | | | 706/1 |
| 2006/0230309 A1* | 10/2006 | Kromer | ............. | G06F 11/2294 |
| | | | | 714/11 |
| 2006/0268679 A1* | 11/2006 | Deng | ............... | H04J 3/14 |
| | | | | 370/216 |
| 2007/0230361 A1* | 10/2007 | Choudhury | ....... | H04L 29/06027 |
| | | | | 370/250 |
| 2008/0046266 A1* | 2/2008 | Gudipalley | ............ | G06Q 10/00 |
| | | | | 370/230 |
| 2008/0144488 A1* | 6/2008 | Tuulos | ............. | H04L 41/0681 |
| | | | | 370/216 |
| 2009/0177692 A1* | 7/2009 | Chagoly | ............ | G06F 11/0709 |
| 2009/0259749 A1* | 10/2009 | Barrett | ............... | G06F 11/3495 |
| | | | | 709/224 |
| 2009/0319658 A1* | 12/2009 | Chioiu | ............... | H04L 41/5009 |
| | | | | 709/224 |
| 2010/0103823 A1* | 4/2010 | Goerge | ............... | H04L 41/044 |
| | | | | 370/242 |
| 2011/0276836 A1* | 11/2011 | Kahana | ............... | G06F 11/0709 |
| | | | | 714/38.1 |
| 2012/0054331 A1* | 3/2012 | Dagan | ............... | G06F 11/0712 |
| | | | | 709/224 |
| 2012/0054554 A1* | 3/2012 | Dagan | ............... | G06F 11/0712 |
| | | | | 714/39 |
| 2013/0262656 A1* | 10/2013 | Cao | ............... | H04L 41/5009 |
| | | | | 709/224 |
| 2014/0172371 A1* | 6/2014 | Zhu | ............... | G06F 11/0709 |
| | | | | 702/185 |
| 2014/0222996 A1* | 8/2014 | Vasseur | ............... | H04L 41/16 |
| | | | | 709/224 |
| 2014/0222998 A1* | 8/2014 | Vasseur | ............... | H04L 41/16 |
| | | | | 709/224 |
| 2015/0281011 A1* | 10/2015 | Gates | ............... | H04L 41/065 |
| | | | | 709/224 |
| 2017/0075749 A1* | 3/2017 | Ambichl | ............... | G06F 11/079 |
| 2017/0134247 A1* | 5/2017 | Hoja | ............... | H04L 43/04 |
| 2017/0154275 A1* | 6/2017 | Maheshwari | ............ | G06N 5/045 |
| 2017/0155537 A1* | 6/2017 | Maheshwari | ............ | H04L 41/064 |
| 2017/0155570 A1* | 6/2017 | Maheshwari | ............ | H04L 43/50 |
| 2018/0034685 A1* | 2/2018 | Naous | ............... | H04L 41/22 |
| 2018/0115464 A1* | 4/2018 | Fighel | ............... | H04L 9/3226 |
| 2018/0219743 A1* | 8/2018 | Garcia | ............... | H04L 41/12 |
| 2018/0248905 A1* | 8/2018 | Cote | ............... | G06K 9/627 |
| 2018/0276063 A1* | 9/2018 | Mendes | ............... | G06F 11/0793 |

\* cited by examiner

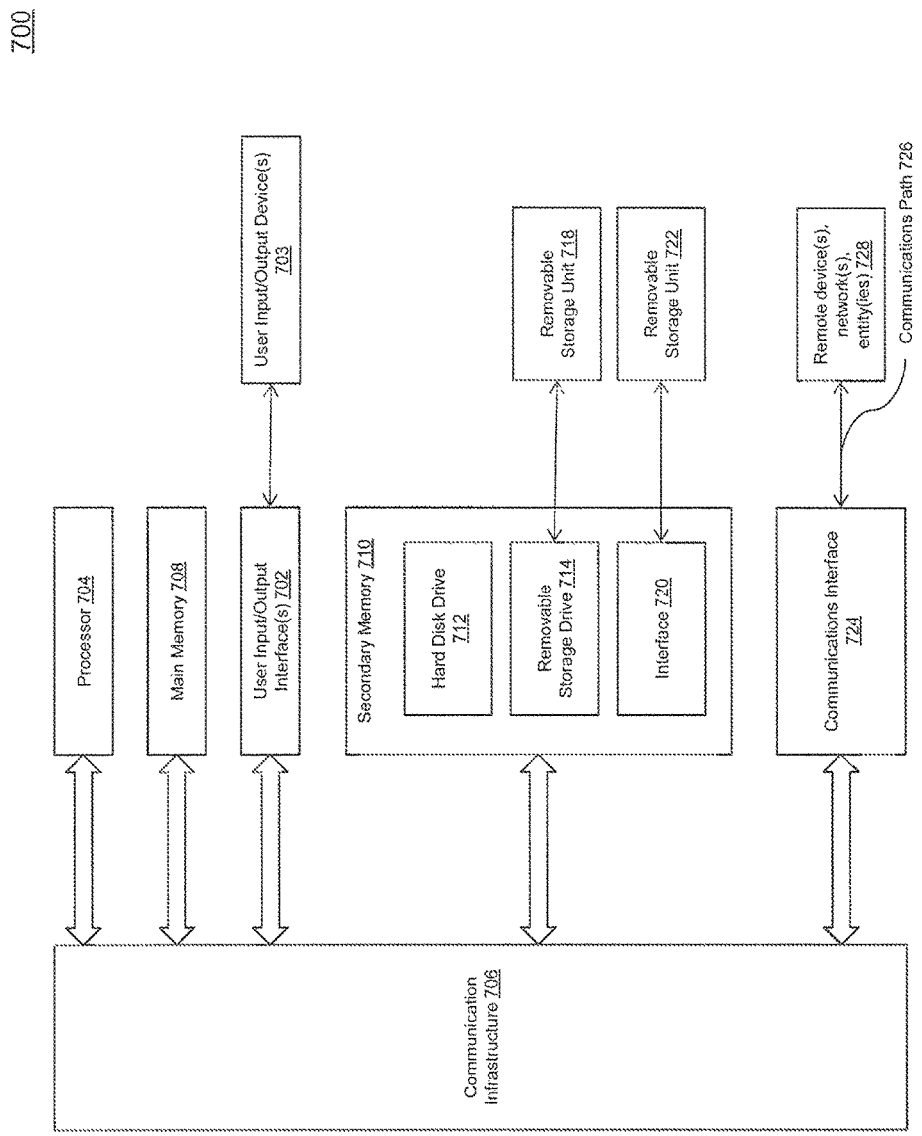

LARGE-SCALE DISTRIBUTED CORRELATION

BACKGROUND

In the field of information technology, various types of metrics data, including numerical and unstructured metrics data, for applications and networks are collected in order to monitor application and network performance. When performance degradation occurs, these collected metrics may be analyzed via correlation to diagnose probable root cause(s). Correlating the collected metrics may allow for the identification of the metrics most correlated to a problematic metric associated with the performance degradation. These most correlated metrics may likely be associated with the probable root cause(s). However, as the number of applications and sampled data for disparate metrics collected per application increases, traditional correlation techniques become less reliable and determining the most correlated metrics becomes exceedingly computationally prohibitive. Beyond the sheer and increasing number of application metrics, applications are also operating on increasingly finer-grained data, such as finer time resolutions for performance data. This finer-grained data further increases the amount of sampled data, which may exacerbate computational complexity needed to perform correlation.

BRIEF DESCRIPTION OF THE DRAWINGS

The accompanying drawings are incorporated herein and form a part of the specification.

FIG. 7 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for performing large-scale distributed correlation. Embodiments allow for effective implementation of Application Performance Management (APM), which refers to detecting, diagnosing, and/or triaging the root cause for performance problems in applications. By efficiently identifying and/or correcting performance problems, performance impact on application users may be minimized and an expected level of service may be maintained. The detailed embodiments may analogously apply to Network Performance Management (NPM), which deals specifically with components in the network, and hybrid APM/NPM.

Figure 1:
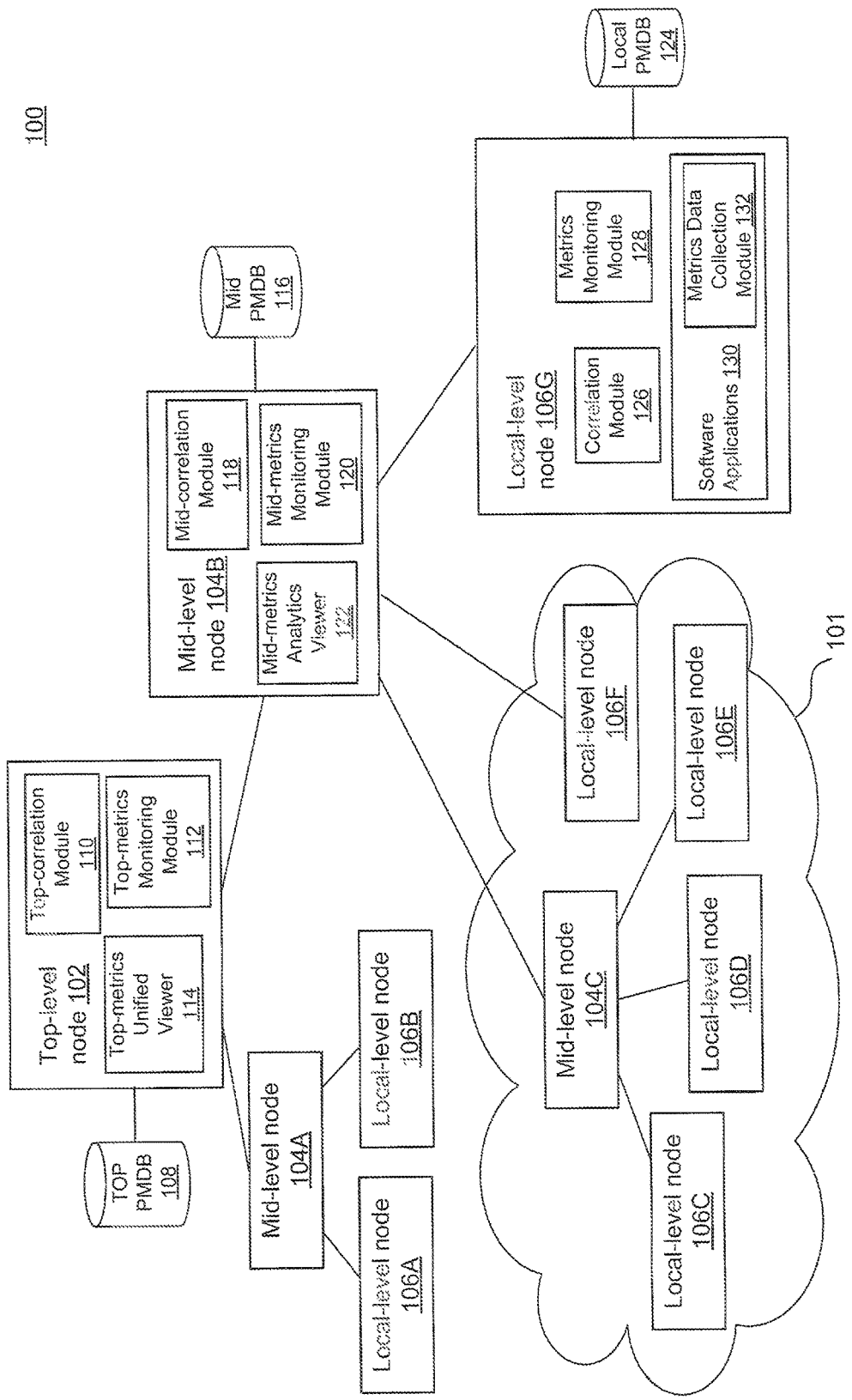
FIG. 1 is a block diagram of a system of hierarchically distributed analytics nodes for performing distributed correlation, according to an example embodiment.

FIG. 1 illustrates a system 100 of hierarchically distributed analytics nodes (top-level nodes 102, mid-level nodes 104, and local-level nodes 106) for performing distributed correlation, according to an example embodiment. The analytics nodes may be designated as top-level nodes 102, mid-level nodes 104, or local-level nodes 106 depending on their roles and/or locations in system 100 of hierarchically distributed analytics nodes. These analytics nodes may be implemented using any type of computing device, for example, web servers, application servers, database servers, computers, or clusters of servers or computers. In an embodiment, one or more of these analytics nodes may be implemented using tiers or hierarchies of servers or computers. In an embodiment, the same computing devices and hardware may be used to implement each of the differently designated analytics nodes.

Many other hierarchical depictions are possible and may often depend on best practices for how and where to collect application-metrics data and perform correlation analysis. The analytics nodes (top-level nodes 102, mid-level nodes 104, and local-level nodes 106) may be connected via a local area network (LAN), metropolitan area network (MAN), or wide area network (WAN) and communicate using any point-to-point or multipoint-to-multipoint networking protocols. However, other wired and/or wireless communication techniques, protocols, and technologies may be used.

Local-level node(s) 106, such as local-level node 106G, may operate software applications 130 and/or be directly operated by clients using software applications 130. Software applications 130 may include various types of enterprise infrastructure software or enterprise application software typically implemented across many servers/computers. Enterprise software may be any purpose-designed computer software to service the needs of an organization. The organizations may range from businesses, schools, clubs, and retailers, to government entities, or any other entity. Accordingly, enterprise software may include, for example, database management system software, human resource management software, enterprise resource planning (ERP) software, supply chain management software, and business intelligence software. Enterprise software may also include E-commerce software and software-as-a-service E-commerce solutions. The application software is not limited to enterprise software and may additionally include content access software (media players, web browsers, etc.), entertainment software (video games, computer games, etc.), educational software, computer simulation software, media development software (video/sound/image editing software, etc.), and product engineering software (computer-aided design software, integrated development environment software, etc.)

Local-level node 106G may also contain correlation module 126, metrics monitoring module 128, and metrics data collection module 132 and communicate with local performance management database (PMDB) 124. Local PMDB 124 may serve as a database and/or database management system to store data needed by the modules. This data may include metrics data, correlation results, correlation and metrics-monitoring parameters, and information communicated between local-level node 106G and higher-level nodes, such as mid-level node 104B. These modules and local PMDB 124 together may allow local-level node 106G the capability to perform both instrumentation and local correlation analytics itself. In an embodiment, local-level nodes 106, such as local level node 106F, may be virtually configured in a cloud environment 101.

In an embodiment, local-level nodes 106, such as local-level node 106G, may be configured to monitor one or more application servers that are external to local-level node 106G. Each application server may run one or more software applications 130. Software application 130 may include one or more of the following: correlation module 126, metrics monitoring module 128, and metrics data collection module 132, may also be implemented within a software application 130.

Metrics data collection module 132 may implement instrumentation by collecting various metrics data used in quantifying performance for software applications 130. In an embodiment, the various metrics data may originate from many disparate application metric domains, some of which are not necessarily from software applications 130. These domains may include:

End-user experience (EUE):—which may include EUE metrics measured through in-browser instrumentation, passive observation of the number of packets or packet flow on a wire, synthetic testing, or end system agents (typically observing packets at the driver level).

Application dependency mapping—which may include run-time application dependency mapping for each application transaction.

Application component monitoring—which may include the nodes's hardware, operating systems, software platforms, application code, shared libraries, databases, and storage systems, etc.

Network infrastructure monitoring—which may include various network infrastructure, such as routers, switches, logical entities such as VPNs, tunnels, and so forth.

Transaction tracing—which may include a detailed understanding of each application transaction that occurred, the physical and software entities that were utilized touched, and their performance, at individual application tiers (web server, application server, etc.) and across multiple tiers simultaneously.

Log processing—which may include any kind of log data, for example from a device-level logs, from software-level logs, or performance anomaly logs, etc.

Event data—which may include any type of event data for any event source such as from monitoring systems, device-generated traps, or syslog messages, or third party systems, etc.

The types of application metrics collected may also be disparate (in time granularity, time synchronization, continuous versus discrete, numerical versus unstructured, etc.) depending on the particular metric and/or metric domain. For example, a typical EUE type metric may be average application response time, which is both numerical and continuous. However, log data metrics are likely unstructured because event data stored in logs are largely in free form text form. In an embodiment, event data may be understood as any type of record that is created in logs and affixed with a timestamp, which may be one of a few numerical data associated with the event data.

Metrics such as memory consumption, CPU utilization, average application response time, average wait time, calls per minute, average request size etc. may apply to many metric domains and are also numerical and be measured at different time granularities. Local-level node 106 may additionally implement application program interfaces (APIs) to external systems, which may provide indirect instrumentation means.

In an embodiment, metrics data collection module 132 may also automatically discover metrics that are available for software applications 130 or other processes running in local-level node 106G. This auto-discovery process may be run whenever a new software application is initiated and/or on a periodic basis. In an embodiment, metrics data collection module 132 may receive metrics-of-interest to monitor from a higher-level analytics node 104 via metrics monitoring module 128.

Metrics monitoring module 128 may monitor the various metrics for applications collected by metrics data collection module 132 and trigger an alert if/when performance degradation for a metric is detected/diagnosed. In an embodiment, monitoring various metrics may include forwarding the collected application-metrics data to local PMDB 124 for long-term storage. By maintaining a local PMDB 124 for each local-level node 106, data may be stored close to its source and improve server processing by minimizing network bandwidth needed to access and manipulate the data. In an embodiment, metrics data at local-level node 106G may be forwarded to a higher-level analytics node, such as mid-level node 104B. Upon receipt of metrics data, mid-level node 104B may forward the metrics data to mid PMDB 116 for long-term storage.

Due to the high volume of real-time metric information generated and potentially collected at local-level node 106G, massive network bandwidths may be needed, which introduces significant network latencies and processing times. In an embodiment, metrics data may be statistically consolidated. In one example, metrics monitoring module 128 may be configured to consolidate 900 raw 1-second samples of a metric into a single "bucketized" histogram time slice representative of the raw samples. The "bucketized" histogram time slice may contain: a consolidation timestamp indicating a time at which consolidation occurs or potentially the most recent sample in the 900 raw samples, sum of all samples, count of all samples (which should be 900, but may vary depending on system status and/or user requirements), and a set of percentile values. The set of percentile values may be, for example, 0% (minimum), 5%, 25%, 50%, 75%, 95%, and 100% (maximum). Of course, the numbers provided for sample sizes and percentile values are exemplary and may be adjusted/configured depending on user requirements.

Local-level node 106G may then transmit the consolidated metric representation to mid-level node 104B to be stored in a more centralized PMDB, mid PMDB 116. The benefits provided by metric consolidation include minimizing overhead on the network, preserving metric distribution (via, for example, the consolidated histogram representation) with very little loss, and storing much more consolidated data in higher-level analytics nodes, such as mid-level node 104B and top-level node 102.

Figure 2:
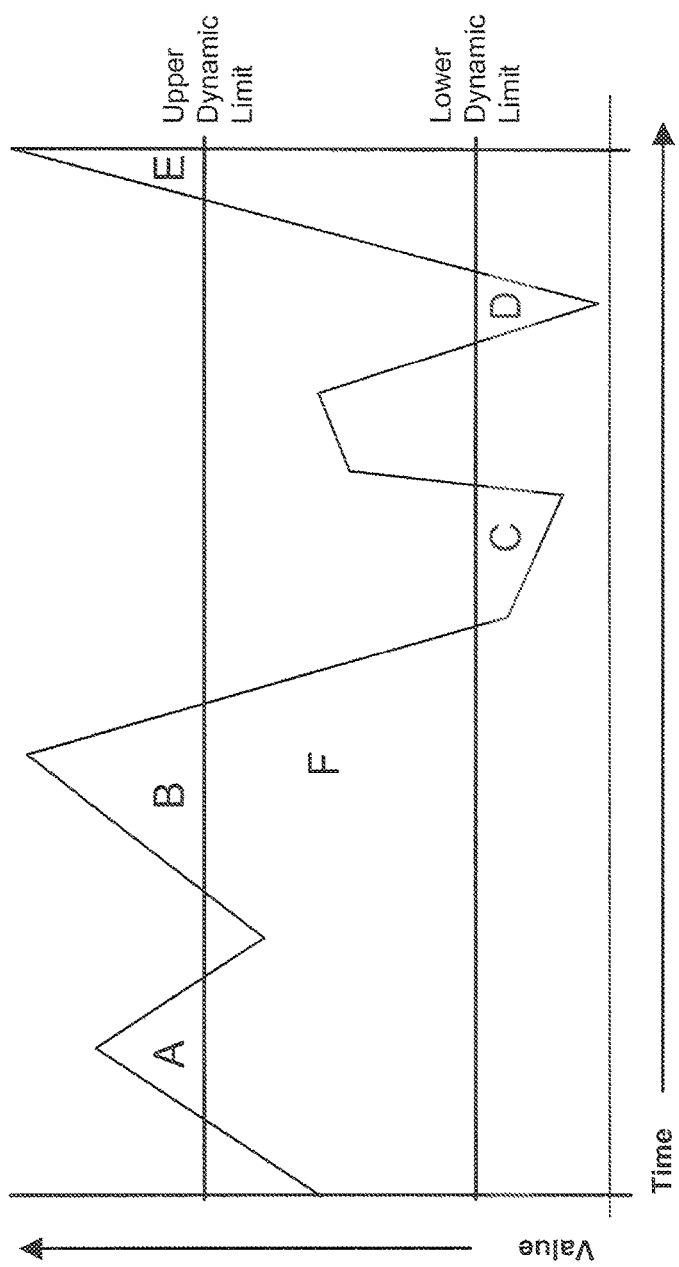
FIG. 2 illustrates an example graphical representation for how metric deviations may be calculated, according to an example embodiment.

FIG. 2 illustrates a metric deviation graph 200, which is a graphical representation for how metrics monitoring module 128 may detect/diagnose metric data anomalies indicative of performance degradation, according to an example embodiment. The graph shows data (value) collected for a metric against time.

In an embodiment, in order to accurately detect/diagnose metric data anomalies, metrics monitoring module 128 may perform dynamic baselining. Dynamic baselining may encompass dynamically learning metric behavior over time (for a particular metric measuring a performance aspect of software application 130) in order to determine what ranges of values for metrics is "typical". A "typical" value may be represented by values between the upper dynamic limit and lower dynamic limit demarcations. Effective dynamic baselining may reduce false alarms as to metric anomalies and provide increase sensitivity to truly unexpected metric behavior.

Metrics monitoring module 128 may detect/diagnose metric data anomalies through deviation scoring and thresholding, which is a method of mathematically/statistically interpreting the metric samples against the dynamic baseline indicated by the upper and lower dynamic limit demarcations. The diagnostic of metric data anomalies may include continuously calculating and analyzing metric deviations of dynamically updated metric data. In an embodiment, the metric data may be stored in a first in, first out (FIFO) data structure such as a rolling buffer. In an embodiment, the rolling buffer may overwrite old metric data with new metric data using, for example, FIFO techniques.

An example method for calculating deviations for a metric is to calculate the ratio of area outside of the "typical" range to area within the "typical" range. In the example in FIG. 2, the following formula would calculate a deviation score: 100*(A+B+C+D+E)/F. Threshold values indicating whether a metric is behaving "abnormally" may be statically defined or automatically and dynamically computed according to learned metric behavior. Deriving deviation scores based on ratios (according to the example formula above) may allow the metric deviation scores to be scale independent. The scale independent nature of deviation scores may enable disparate metrics from different tiers or levels of analytics nodes to be compared, analyzed, and ranked at metrics monitoring module 128 and correlation module 126 on local-level node 106G.

When the deviation score exceeds/violates a "normal" threshold, metrics monitoring module 128 may trigger an alert and initiate a distributed correlation process to diagnose the root cause for the violation by propagating the alert to a higher-level analytics node, such as mid-level node 104B. Due to the scale independent nature of deviation scores, disparate metrics from different tiers or levels of analytics nodes may also be compared, analyzed, and ranked at the higher-level analytics node, such as mid-level node 104B. In an embodiment, an alert may be internally or externally provided. Example triggers for the alert may include event from a $3^{rd}$ party (external) event management system, rule-triggered event from processing log data (internal or external), or manually provided input from, for example, a help desk call.

Correlation module 126, from local-level node 106G, may be capable of performing both local and distributed correlation analytics. Local correlation refers to performing correlation among metrics collected locally at local-level node 106G and likely stored in local PMDB 124. Distributed correlation may refer to executing a correlation request initiated from another analytics node in system 100. In an embodiment, distributed correlation includes correlating a time series of data that is "passed in" against locally stored metrics data. The correlation request and time series may have been passed to local-level node 106G via mid-level node 104B. In an embodiment, the time series may have originated from a higher-level analytics node, such as top-level node 102, and subsequently "passed in" to mid-level node 104B.

At a basic level, correlation is a technique that may be used to determine how related application metrics are to each other. The generated correlation results may be used to identify probable root causes of metrics anomalies indicative of application performance problems. For example, in a banking application, metrics data collection module 132 may collect response times for when bank account balances are checked to quantify the service level delivered to an end user performing a specific transaction. Upon triggering an alert when the service level degrades below an acceptable threshold, correlation techniques may be utilized to determine the cause of the degradation—e.g. an overloaded server or under-resourced virtual machine, a faulty communication pathway causing packet errors, a poorly implemented database query, misconfigured load balancing, etc.

While correlation may not imply causality, correlation in the context of domain specific knowledge permits diagnosis of a "probable root cause." if application metric A is known to depend on application metric B, and the physical mechanism of the dependency is understood, then it may be inferred with a high probability that a spike in A is likely caused by a spike in metric B. By extension, a spike in metric B may further inferred to be caused by a dip in metric C if an inverse relationship between metric B and C exists and is understood.

Figure 3:
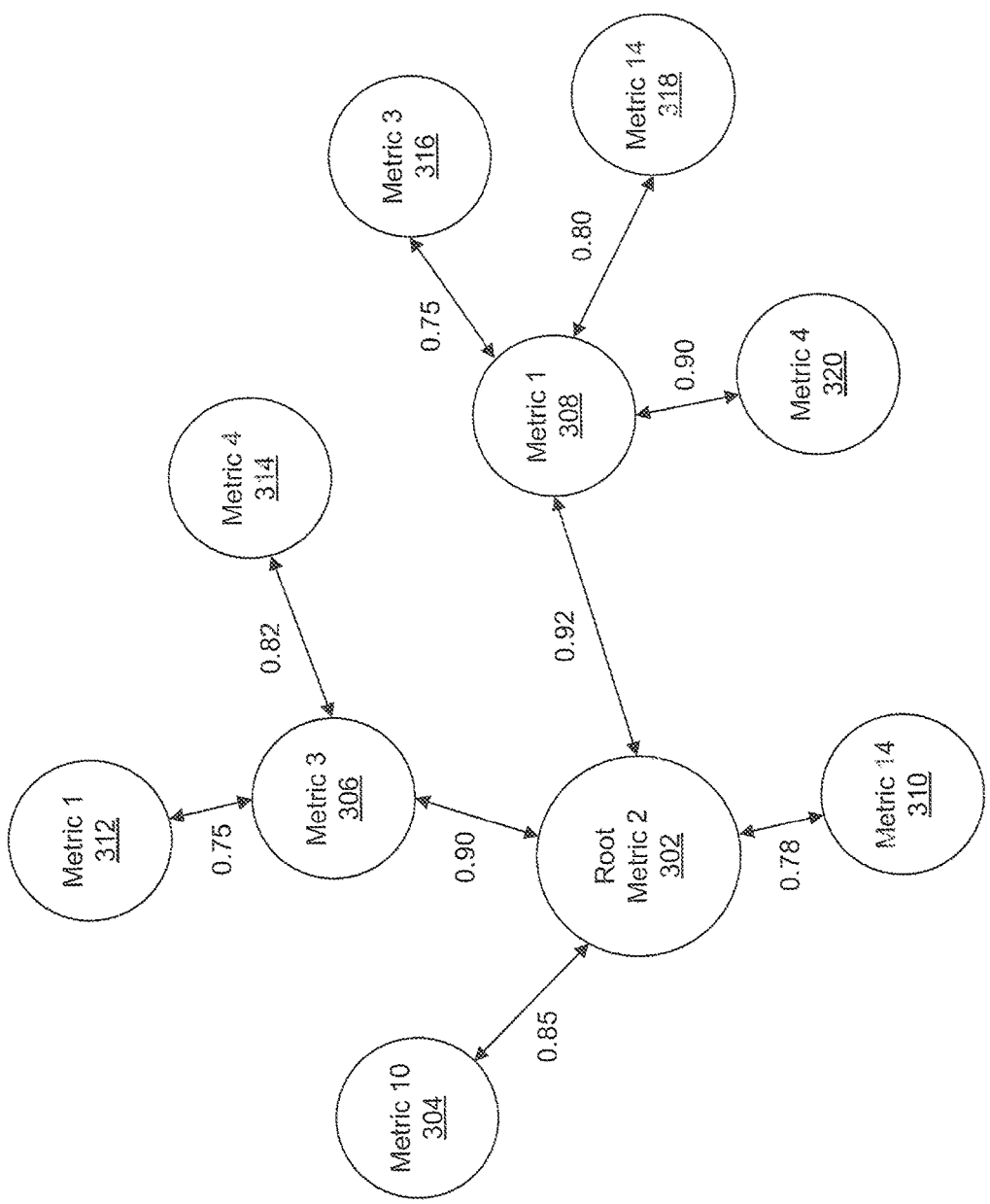
FIG. 3 illustrates an example correlation graph constructed during correlation calculations, according to an example embodiment.

In an embodiment, correlation module 126 may perform correlation of application metrics by constructing graphs of pairwise application metric dependencies. FIG. 3 illustrates a possible metrics correlation graph 300 constructed by correlation module 126, according to an embodiment. The nodes in metrics correlation graph 300 represent application metrics stored in local PMDB 124 used in the correlation. The edges connecting nodes represent dependencies between the nodes and the associated labels indicate a correlation strength correlation coefficient. A node may be designated an application metric of interest, e.g. the root of a tree in the graph. In an embodiment, metrics-of-interest, such as a time-series data for root metric 2, may have been passed in from mid-level node 104B. The example in FIG. 3 additionally depict two levels of correlations, indicating the highest number of dependencies between a root metric 2 and another node, for example, metric 1 (312). The graph may have almost arbitrary structure due to noise and imprecision that may be inherent in metrics data due to issues such as data granularity, time synchronization, and missing or inaccurate data.

The number of levels of dependencies and the metrics identified at each level may also be statically or dynamically configured depending on a variety of factors including correlation strengths, resource availability, processing power, and user requirements/rules at a particular local-level node 106. Limitations and bounds to correlation computations may be necessary because for a number N of metrics collected and/or received at a local-level node 106, there may be N(N−1) pairs of correlation computations at that level and (N−1)(N−2) pairs of correlation computations at a succeeding level, and so forth. As the number N of metrics reach the thousands and tens of thousands e.g. across many nodes, completing computations become exceedingly resource intensive.

For example, in FIG. 3, only the four most highly correlated metrics may have been selected (nodes 304, 306, 308, and 310) for the first level of dependency to root metric 2 (302). In an embodiment, the four nodes in the first level of dependency may have been selected when the correlation strength exceeds 0.75. In another embodiment, a hybrid of correlation strength thresholds and maximum number of selected nodes may be utilized.

Upon constructing the graph in FIG. 3, various leaf nodes (non-root nodes) may be pruned or filtered based on the strength of correlation where a lower correlation coefficient may indicate less probably causal pathways. In an embodiment, the filtering may be alternatively (or in combination) accomplished using search or mathematical programming techniques such as max-flow min-cut to identify path(s) of maximal end-to-end correlation strengths.

In an embodiment, metrics data collection module 126 may also collect information relating to application and network dependency maps, which may be used in the construction and/or pruning of correlation graphs. The application dependency map may be statically generated or generated at run-time or in real-time. A run-time application dependency map may depict Layer 3 topology at run-time just prior to execution. Network dependency maps may depict how specific application device are actually connected in the network. For example, if the application dependency map and/or the network dependency map show metric 1 (308) is independent from root metric 2 (302) then metric 1(308) (and its leaf nodes 316, 318, and 320) are clearly not a probably cause of the alert triggered for root metric 2 (302) and can be pruned.

Figure 6:
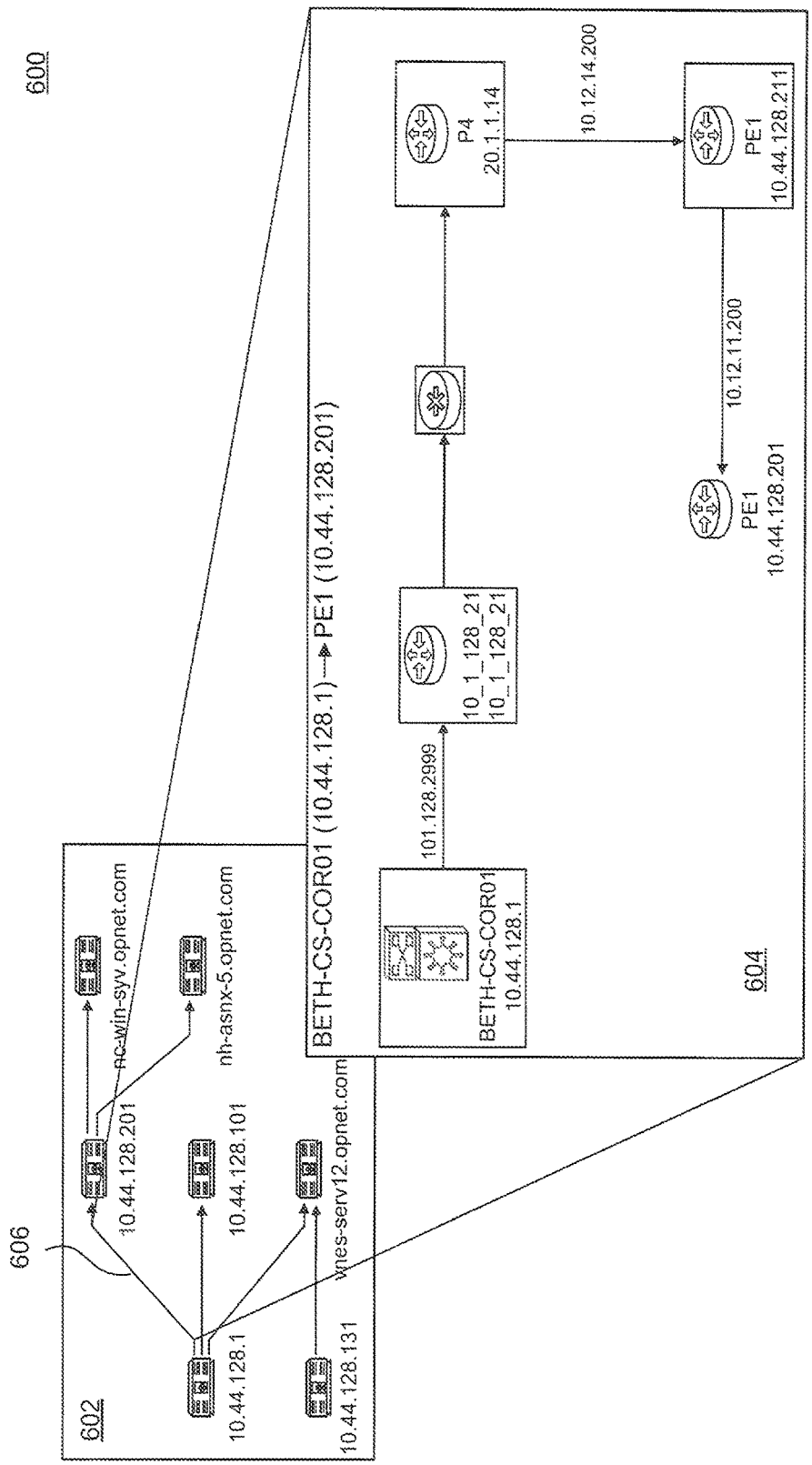
FIG. 6 is a diagram illustrating an example application dependency map including a view of a corresponding network dependency map, according to an example embodiment.

FIG. 6 illustrates a diagram 600 of an example application dependency map 602 and a corresponding network dependency map 604 that is generated based on information associated with connection 606 between two application components within application dependency map 602. The application dependency map 602 and network dependency map 604 may be generated by one or more mapping tools within nodes 102, 104, and 106 of system 100. The mapping tools may be configured to automatically generate application dependency map 602 and network dependency map 604, according to an embodiment. In an embodiment, the mapping tools may be configured to manually, based in part on user input, generate application dependency map 602 and network dependency map 604, or use a combination of automatic generation and manual generation. In an embodiment, as depicted in FIG. 6, the application dependency map 602 and network dependency map 604 may be generated by a single mapping tool.

Application dependency map 602 may provide a visualization of the flow of data throughout multiple domains and components of an application architecture across one or more servers/computers of an organization. The multiple components may include front-end web page URLs, application components, server infrastructure components, virtual-to-physical infrastructure components, databases, transaction tables, and user clients.

Upon selecting connection 606 between two application components, the mapping tool may generate a network dependency map 604 visualizing a network path between the two application components. In an embodiment, the network path may consist of Layer 2/Layer 3 path information including both physical and logical (e.g., IP routing domains, tunnels, etc.) path information. Data metrics related to the network may include interface packet loss, latency, and host CPU utilization, or any other metric collected by any node along the network path of network dependency map 604. In an embodiment, the mapping tool may generate a network dependency mapping of the entire workflow (or for a portion of the application components within application dependency map 602) as opposed to the connection 606 just between two application components as illustrated in FIG. 6.

In an embodiment, application/network dependency map information may be propagated from lower-level nodes 106 up the system 100 of hierarchically distributed analytics nodes to mid-level node 104, and ultimately to top-level node 102. The top-level node 102 may maintain a system view of the application/network dependency mappings for software applications 130 and associated metrics in system 100. With access to a system-wide application/network dependency mapping, top-level node 102 may propagate dependencies back down through mid-level nodes 104 (if any) to lower-level nodes 106. The lower-level nodes may then either use the dependencies to further prune the correlation graphs and/or construct the correlation graphs more efficiently by ignoring metrics unrelated to the root metric.

Similar to local-level nodes 106, mid-level nodes 104, such as mid-level node 104B, may likewise contain mid-correlation module 118, mid-metrics analytics viewer 122, and mid-performance monitoring module 120. Mid-level node 104B may also store raw/aggregated metrics data received from a lower-level mid-level node 104 or local-level 106 in mid PMDB 116. In an embodiment, mid-level node 104, such as mid-level node 104C, may be virtually configured in cloud environment 101.

Mid-metrics monitoring module 120 may propagate alerts triggered in a lower-level node 106 or passed via a lower-level mid-level node 104 up system 100. In an embodiment, mid-metrics monitoring module 120 may also centralize the raw/aggregated metrics data received from a lower-level mid-level node 104C and local-level nodes 106F and 106G in mid PMDB 116. The stored metrics data may allow for correlation computations to be performed at mid-level node 104B without propagating the distributed correlation request received from a higher-level analytics node such as top-level node 102. In an embodiment, due to the aggregated and approximate nature of metrics data stored in mid PMDB 116, mid-level node 104B may make a determination to process the correlation locally or propagate the distributed correlation request to a lower-level analytics node based on a threshold for an aggregation level of the metrics. This threshold may be manually or automatically configured depending on whether historically diagnosed probable causes have been accurate.

Mid-correlation module 118 performs functions analogous to those for correlation module 126 in local-level 106G. In an embodiment, upon receiving a distributed correlation request from a higher-level analytics node (such as top-level node 102), mid-correlation module 118 may be able to selectively perform correlation computations at mid-correlation module 118 or propagate the distributed correlation request to lower-level nodes (mid-level node 204) or lower-level nodes 106.

In an embodiment, a distributed correlation request received from a higher-level analytics node may be selectively propagated down system 100 based on the application/network dependency mapping maintained at top-level node 102 to improve analytics efficiency. This dependency mapping may be constructed, for example, for a given transaction. If mid-level node 104C and its local-level nodes 106C, 106D, and 106E are known to be not involved with the given transaction, there is no reason for mid-level node 104B to propagate the received distributed correlation request to mid-level node 104C. Another advantage includes reducing false positives in con-elation computations since uninvolved analytics nodes and associated metrics are pruned from the correlation graph, eliminating any "coincidental" correlation results.

Mid-metrics analytics viewer 122 in mid-level node 104B may allow for a user or administrator to analyze and/or view the deviations for application metrics data calculated at child analytics nodes 104C, 106F and 106G. Since metric-deviations scores may be scale independent, mid-metrics analytics viewer 122 may easily compare and rank metrics in its domain based on the deviation scores. In an embodiment, mid-metrics analytics viewer 122 may propagate the deviations data for application metrics up the system 100, ultimately to top-level node 102.

In an embodiment, mid-metrics analytics viewer 122 may also display correlation results of deviating metrics that are computed by mid-correlation module 118. The correlation results may be shown in a graphical representation as depicted in FIG. 3, or as a table of correlation results, or any other suitable representation. The combination of the deviations view and the correlations view may enable mid-metrics analytics viewer 122 to discover bottlenecks and probable causes of performance degradation of the nodes 104 and 106 being monitored by mid-level node 104B.

Top-level node 102 may contain top-correlation module 110, top-metrics unified viewer 114, and top-performance monitoring module 112. Top-level node 102 may also store selected and/or aggregated metrics data received from a lower-level mid-level node 104. In an embodiment, top-level node 102 may also receive and store selected and/or aggregated metrics data from a lower-level node 106.

Top-metrics monitoring module 112 may perform functions analogous to those described for mid-metrics monitoring module 120. Top-metrics monitoring module 112 similarly receives collected metrics data (that are consolidated in an embodiment) from lower-level analytics nodes and stores the metrics data into top PMDB 108. As discussed for mid-metrics monitoring module 120, top-metrics monitoring module 112 may also receive application/network dependency mapping information to construct a system-wide dependency mapping for software applications 130 or a particular component or transaction in software applications 130.

Top-metrics monitoring module 112 may conversely push/propagate system-wide dependency mapping information to lower-level analytics nodes. As discussed above, the dependency information may be used to construct and/or prune correlation graphs at mid-level nodes 104 or local-level nodes 106. In order to implement the previously described dynamic baselining and anomaly detection, top-metrics monitoring module 112 may also push/propagate various thresholds, demarcations, and rules used in the deviation scoring and alert triggering procedures performed in local-level nodes 106.

Top-correlation module 110 may initiate distributed correlation for a metric-of-interest by propagating the distributed correlation request among the child analytics nodes 104 and 106. In an embodiment, the distributed correlation for a metric-of-interest is initiated upon receiving a metric-of-interest selected by a user. In an embodiment, the distributed correlation for a metric-of-interest is initiated upon receiving an alert that has been triggered by a local-level node 106 and propagated up system 100. Top-level node 102 may similarly use the received dependency mapping information to selectively propagate the distributed correlation request to lower-level analytics nodes that are known to be relevant to the metric-of-interest.

Once the distributed correlation request is received processed at lower-level nodes 104 and 106, top-correlation module 110 may receive correlation results promoted from those lower-level nodes 104 and 106. Then, top-correlation module 110 may aggregate deviation scores and rankings and determine the probably root cause for the metric anomaly.

Top-metrics unified viewer 114 may be implemented as a dashboard that is configured to present two types of views: monitoring view and analytics view. The monitoring view may display metrics data received from mid-level nodes 104 at an instance in time. For example, a user may view response times (an example metric data) of an application in real-time using the dashboard. The analytics view may display the information received and processed by top-correlation module 110 and top-metrics monitoring module 112 and presents unified reporting of statistics for application metrics across disparate metric domains in system 100. Top-metrics unified viewer 114 may also globally aggregate application-metrics statistics (including deviations) of the same type across lower-level analytics nodes 104 and 106. In an embodiment, top-metrics unified viewer 114 may provide a convenient and centralized dashboard for users to monitor and track the performance of operating software applications 130 in the system.

In an embodiment, analytics view may present analytics of metrics data in a drill down approach. For example, a user within the analytics view of the dashboard may view a workflow of data within system 100. The workflow may be presented and visualized in one or more runtime application dependency maps and/or network dependency maps. In an embodiment, the workflow may be visualized as an application dependency map with capabilities to drill-down into network dependency maps corresponding to components of the application dependency map as described with regards to FIG. 6. The application and network dependent maps may each be system or user generated.

The analytics view may be configured to drill down into the workflow and show deviations of relevant metrics when a section of the workflow is selected by a user. The workflow view may be, for example, a flow of data through a network and/or various servers/computers. In an embodiment, the analytics view may be configured to further drill down into the deviations view to show correlation results of selected deviating metrics. The presented correlation results may enable the user to identify one or more probable cause(s) of a deviating metric. The correlation results may be shown in a graphical representation as depicted in FIG. 3, or as a table of correlation results, or any other suitable representation. Though not depicted in FIG. 1, mid-level nodes 104 may implement a version of top-metrics unified viewer 114 as discussed where mid-level nodes 104 may view analytics of data metrics of nodes being monitored by mid-level nodes 104.

By utilizing numerous mid-level node(s) 104 and a top-level node 102 to coordinate correlation analytics among local-level node(s) 106 in the described distributed manner, system 100 may be massively scalable. Therefore, more local-level node(s) 106 may be added, more applications may be operated, and more metrics for those applications can be collected without significantly hindering the implementation of effective Application Performance Management.

Figure 4:
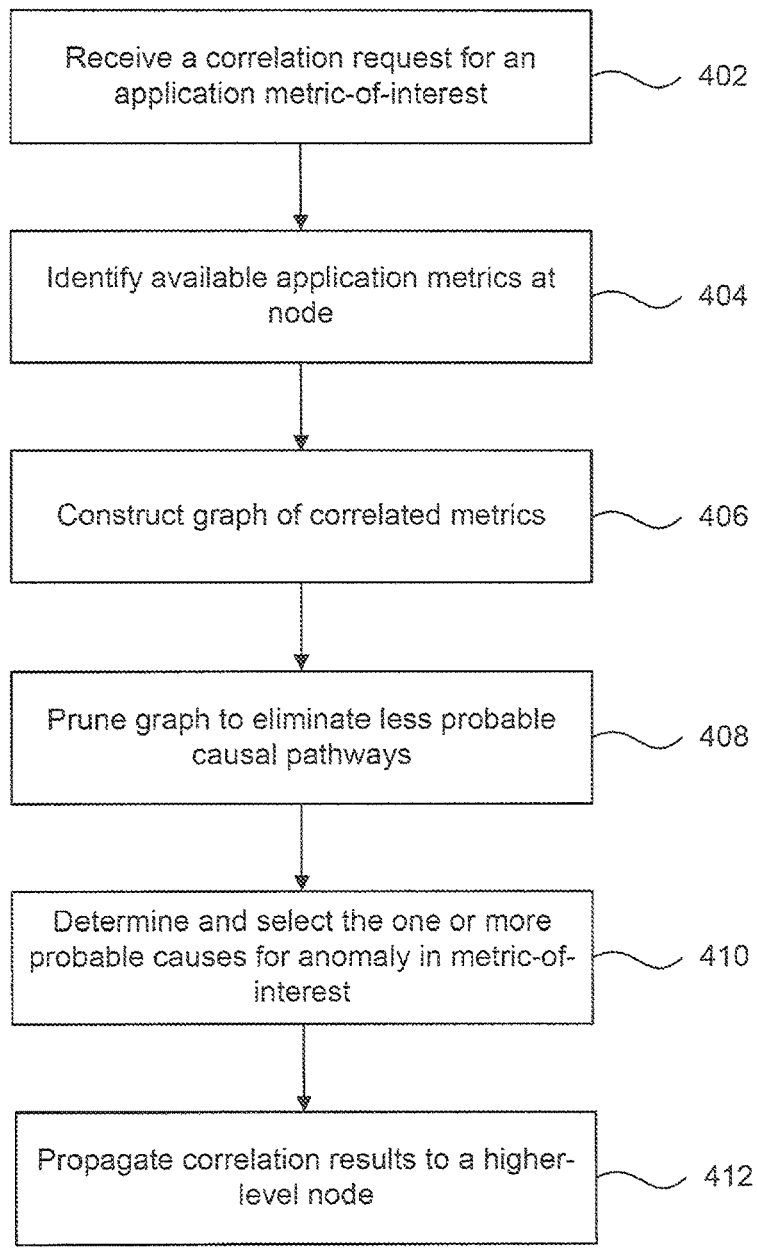
FIG. 4 is a flowchart illustrating a process of performing a local correlation at a local-level node, according to an example embodiment.

FIG. 4 illustrates a method 400 for performing a local correlation at a local-level node 106, according to an embodiment. In an embodiment, method 400 may also be performed by a mid-level node 104. Method 400 may be performed by processing logic that may comprise hardware (e.g., circuitry, dedicated logic, programmable logic, microcode, etc.), software (e.g., instructions run on a processing device), or a combination thereof.

In step 402, correlation module 126 in local-level node 106G may receive a distributed correlation request for an application metric of interest from a higher-level analytics node, such as mid-level node 104B. The distributed correlation request may have been initiated at top-level node 102. In an embodiment, the distributed correlation request may be accompanied by a time series of the metric-of-interest to be correlated against metrics stored locally in local PMDB 124. In an embodiment, local-level node 106G may also receive or previously receive application/network dependency mapping information associated with the particular metric-of-interest.

In step 404, correlation module 126 may identify available application metrics collected and stored in local PMDB 124 to be used in correlation calculations. In an embodiment, some available application metrics may be ignored if determined to be irrelevant to the metric-of-interest based on received application/network dependency mapping information.

In step 406, correlation module 126 may construct a graph of metrics most correlated with the metric-of-interest, wherein each node of the graph represents a metric and each edge between two nodes is associated with a strength of the correlation between the two nodes. Depending on resources available to correlation module 126 and/or parameters specified by a user, various parameters such as the number of nodes in the graph or the levels of dependencies from the metric-of-interest (root node) may be constrained. In an embodiment, correlation module 126 may be allotted certain processing resources by local-level 106G or mid-level node 104B. For example, graph construction may halt when memory and/or processing resource rises above a certain threshold on local-level node 106G. One exemplary graph construction is depicted and discussed in FIG. 3.

In step 408, correlation module 126 may prune the graph to eliminate less probable causal pathways based on the strength of correlation because a lower correlation coefficient may indicate less probably causal pathways. The pruning may alternatively (or in combination) be accomplished using search or mathematical programming techniques such as max-flow min-cut to identify path(s) of maximal end-to-end correlation strengths. In an embodiment, the graph is further pruned based on received application/network dependency mapping information, for example as discussed in FIG. 3.

In step 410, correlation module 126 may determine and select the node associated with the most probable cause for the anomaly in the metric-of-interest from the graph. The most probable cause and associated metric may be a node that is not directly connected to the metric-of-interest (root node). Instead, the selected node may be one or more levels from the root node. In an embodiment, one or more probable cause(s) (associated with highly correlated metrics) may be selected.

In step 412, correlation module 126 may propagate correlation results up system 100 via mid-level node 104B. Each successively higher-level analytics node and associated correlation module 118 aggregates and analyzes the lower-level correlation results. At the highest-level analytics node, top-level node 102, the top-metrics unified viewer 114 may present the aggregated and analyzed correlation results to an interested user. The user may then address the identified probable cause of performance degradation to maintain a level of service.

Figure 5:
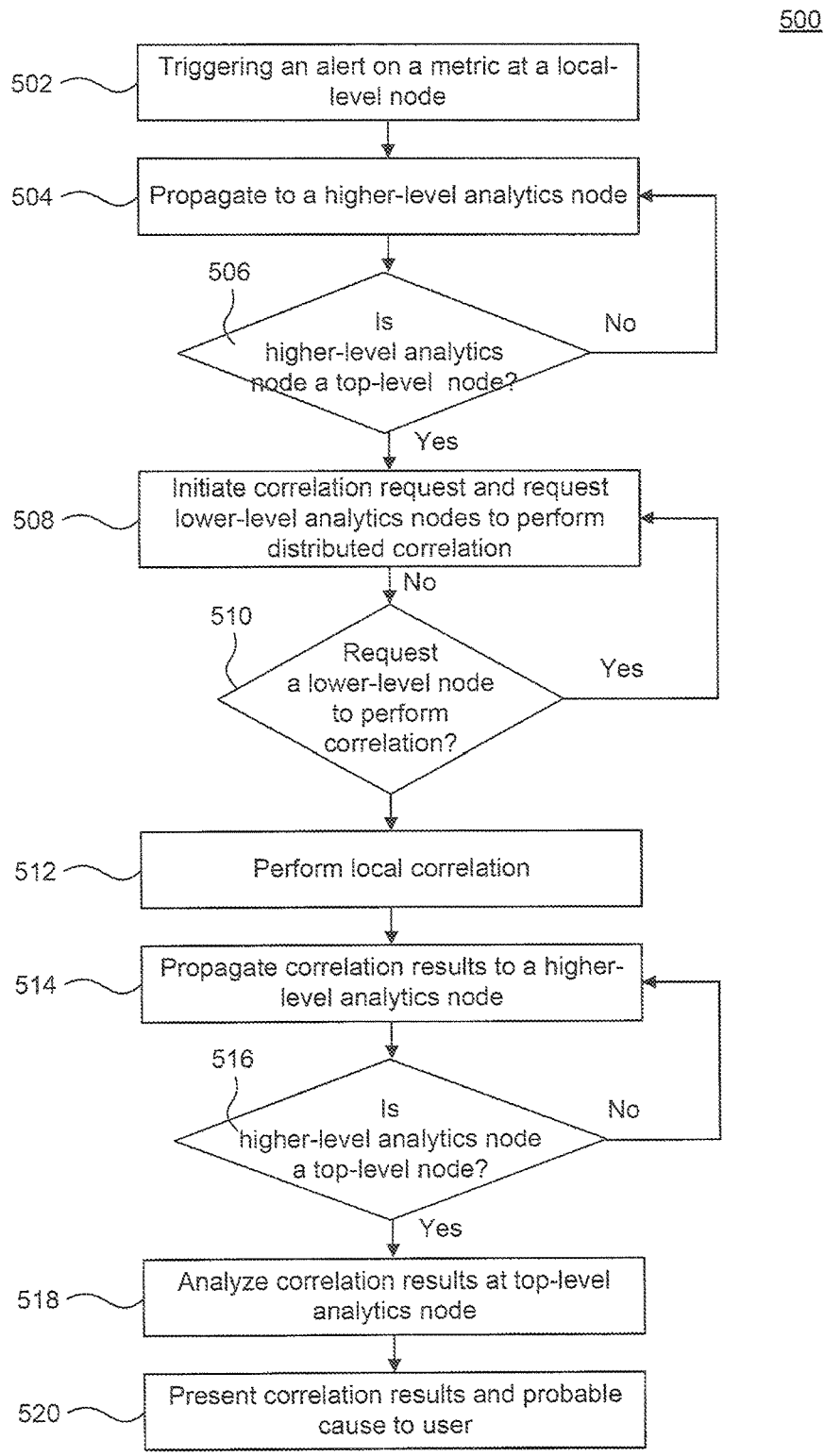
FIG. 5 is a flowchart illustrating a process of diagnosing application-performance degradation using distributed correlation, according to an example embodiment.

FIG. 5 illustrates a method 500 for detecting/diagnosing application-performance degradation using distributed correlation, according to an embodiment. Method 500 may be performed by analytics nodes present in system 100 of FIG. 1 according to metrics monitoring described in FIG. 2 and correlation strategies/methods discussed in FIGS. 3-4. Method 500 may be performed by processing logic that may comprise hardware (e.g., circuitry, dedicated logic, programmable logic, microcode, etc.), software (e.g., instructions run on a processing device), or a combination thereof.

In step 502, metrics monitoring module 128 in a local-level node 106G may trigger an alert on a metric-of-interest collected by metrics data collection module 132 and stored in local PMDB 124. In an embodiment, the alert is triggered if performance degradation for a metric is detected/diagnosed. To detect/diagnose metric data anomalies, metrics monitoring module 128 may perform dynamic baselining to learn what ranges of values for metrics define "typical" behavior. Using bounds for "typical" metrics values, metrics monitoring module 128 may calculate deviation scores and trigger an alert if the deviation scores exceed a dynamically determined threshold. An exemplary deviation scoring process for identifying an anomalous metric (metric-of-interest) and consequently triggering the alert was described in FIG. 2.

In step 504, a metrics monitoring module 128 (or mid-level metrics monitoring module 120 in a mid-level node 104) may propagate the triggered alert to a higher-level analytics node (mid-level nodes 104 or top-level nodes 102). In an embodiment, metric-of-interest data such as a time series (or consolidated metrics data) may be associated with and propagated along with the triggered alert.

In step 506, if the higher-level analytics node to receive the triggered alert in step 502 is not top-level node 102, then the method 500 returns to step 504. The triggered alert may be propagated up system 100 of hierarchically distributed analytics nodes until a top-level level node receives the triggered alert. Otherwise, method 500 proceeds to step 508.

In step 508, top-level node 102 may receive the triggered alert and top-correlation module 110 in top-level node 102 may initiate a distributed correlation request, further described with reference to FIG. 1. The initiation may include requesting lower-level analytics nodes to perform the distributed correlation request.

In step 510, for each lower-level analytics node that receives a distributed correlation request from a higher-level analytics node, the lower-level analytics node may make a determination as to whether to locally perform the distributed correlation or to propagate the distributed correlation request to its child lower-level analytics nodes 104 and 106. If the lower-level analytics node is local-level node 106, then a local correlation is performed. In an embodiment, a mid-level node 104 may locally perform the distributed correlation or propagate the distributed correlation request. Further embodiments and details are provided in FIG. 4.

In step 512, the lower-level node 106 (or in an embodiment mid-level node 104) may perform the distributed correlation by first constructing a graph of metrics highly correlated with the metric-of-interest specified in the distributed, correlation request. Various metrics may be pruned from the graph and the metric(s) associated with the most probable cause of performance degradation may be selected.

In step 514, the lower-level node 106 (or in an embodiment mid-level node 104) may aggregate and analyze correlation results and/or propagate the correlation results to a higher-level analytics node, which may be top-level nodes 102 or mid-level nodes 104. Further embodiments and details are described in FIGS. 1 and 4.

In step 516, if the higher-level analytics node receiving the correlation results from 514 is not top-level node 102, then the method proceeds to step 514. The correlation results may be propagated up system 100 of hierarchically distributed analytics nodes until a top-level level node receives the correlated results. Otherwise, method 500 proceeds to step 518.

In step 518, top-correlation module in top-level node 102 may aggregate and analyze the con-elation results received from the lower-level analytics nodes, for example described in FIG. 1. In an embodiment, top-correlation module may rank the correlation results based on the strength of correlation. Relatedly, top-correlation module may produce an ordered set of correlated metrics by ranking.

Finally, in step 520, top-metrics unified viewer 114 may present the probable cause for the metric anomaly and associated degradation in performance of software applications 130. In an embodiment, top-metrics unified viewer 114 may present and/or rank the most probable causes in a global dashboard interface. The global dashboard interface may allow a user to efficiently detect and diagnose performance degradation in system 100. Other details and embodiments are described in FIG. 1.

Method 500 of FIG. 5 has been described as a bottom-up approach for determining one or more probable causes for anomalous metrics data. In method 500, metrics data and deviating metrics are triggered by local-level nodes 106 first and propagated up the hierarchy top-level node 102. Eventually, top-level node 102 may receive the trigger and initiate correlation request to perform distributed correlation. In an embodiment, top-level node 102 may itself initiate a distributed correlation request without being prompted by lower level nodes. This top-down approach may be implemented by steps 508-520. In step 508 of this embodiment, top-level node 102 may initiate the correlation request without receiving any triggers from lower-level nodes. In an embodiment, the triggering may instead be received by an administrative user operating top-level node 102 via, for example, top-metrics unified viewer 114.

Various embodiments may be implemented, for example, using one or more well-known computer systems, such as computer system 700 shown in FIG. 7. Computer system 700 may be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired, and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
one or more computing devices; and
a local-level node, implemented on the one or more computing devices, configured to:
trigger an alert for a performance metric of an application executing on the local-level node, wherein the alert indicates anomalous behavior for the performance metric, and
send the alert to a higher-level node, implemented on the one or more computing devices;
receive a distributed correlation request from the higher-level node, wherein the distributed correlation request is initiated to determine a root cause of the alert;
construct a correlation graph, the correlation graph including a root node representing the performance metric, a plurality of leaf nodes representing other performance metrics correlated with the performance metric, and a plurality of edges connecting the root node and the plurality of leaf nodes, each edge representing a dependent relationship between two performance metrics;
assign a correlation strength to each of the plurality of edges;
select one or more of the plurality of leaf nodes to be included in a correlation result based on the correlation strength assigned to each of the plurality of edges connected to the plurality of leaf nodes; and
send the correlation result to the higher-level node;
wherein the higher-level node is configured to:
select a probable cause of triggering the alert based on the performance metrics represented by the one or more leaf nodes included in the correlation result; and
present the probable cause to a user.

2. The system of claim 1, wherein to trigger the local-level node is further configured to:
detect that the performance metric contains metric values that are anomalous by calculating deviations of the metric values from a dynamic baseline.

3. The system of claim 1, wherein the local-level node is further configured to:
collect performance metric values for the performance metric across a period of time;
consolidate the performance metric values, collected across the period of time, into a bucketized histogram time slice; and
send the consolidated performance metric values to the higher-level node.

4. The system of claim 3, wherein the higher-level node has a parent higher-level node, and wherein the higher-level node is further configured to:
receive the distributed correlation request from the parent higher-level node, wherein the distributed correlation request includes the performance metric;
perform correlation between the performance metric and other metrics collected or received at the higher-level node, wherein the correlation is performed using the consolidated performance metric values; and
select the probable cause based on the performed correlation and the correlation results.

5. The system of claim 3, wherein the local-level node is further configured to:
collect second performance metric values for a second performance metric across the period of time;
consolidate the second performance metric values into a second bucketized histogram time slice; and
correlate the bucketized histogram time slice against the second bucketized histogram time slice in order to produce the correlation result.

6. The system of claim 1, wherein the local-level node is further configured to:
track application-dependency-mapping information for the application; and
send the application-dependency-mapping information to the higher-level node.

7. The system of claim 6, wherein the higher-level node is further configured to:
receive the application-dependency-mapping information from the local-level node; and
send the distributed correlation request to the lower-level node depending on whether the received application-dependency-mapping information indicates a relationship between the higher-level node and the local-level node.

8. The system of claim 6, wherein the local-level node is further configured to:
prune leaf nodes of the correlation graph depending on whether the application-dependency-mapping information conflicts with the plurality of edges connecting the root node and the plurality of leaf nodes.

9. A method, comprising:
triggering, by a local-level node that is implemented on one or more computing devices, an alert for a performance metric of an application executing on the local-level node, wherein the alert indicates anomalous behavior for the performance metric;
sending the alert to a higher-level node that is implemented on the one or more computing devices;
receiving a distributed correlation request from the higher-level node, wherein the distributed correlation request is initiated to determine a root cause of the alert;

constructing a correlation graph, the correlation graph including a root node representing the performance metric, a plurality of leaf nodes representing other performance metrics correlated with the performance metric, and a plurality of edges connecting the root node and the plurality of leaf nodes, each edge representing a dependent relationship between two performance metrics;

assigning a correlation strength to each of the plurality of edges;

selecting one or more of the plurality of leaf nodes to be included in a correlation result based on the correlation strength assigned to each of the plurality of edges connected to the plurality of leaf nodes; and sending the correlation result to the higher-level node, wherein the higher-level node is configured to select a probable cause of triggering the alert based on the performance metrics represented by the one or more leaf nodes included in the correlation result, and present the probable cause to a user.

10. The method of claim 9, wherein the triggering further comprises:

detecting, at the local-level node, if the performance metric contains metric values that are anomalous by calculating deviations of the metric values from a dynamic baseline.

11. The method of claim 9, further comprising:

collecting, at the local-level node, performance metric values for the performance metric across a period of time;

consolidating the performance metric values, collected across the period of time, into a bucketized histogram time slice; and sending the consolidated performance metric values to the higher-level node.

12. The method of claim 11, further comprising:

collecting, at the local-level node, second performance metric values for a second performance metric across the period of time;

consolidating the second performance metric values into a second bucketized histogram time slice; and correlating the bucketized histogram time slice against the second bucketized histogram time slice in order to produce the correlation result.

13. The method of claim 9, wherein the higher-level node has a parent higher-level node, the method further comprising:

receiving by the higher level node the distributed correlation request from the parent higher-level node, wherein the distributed correlation request includes the performance metric;

performing by the higher level node correlation between the performance metric and other metrics collected or received at the higher-level node, wherein the correlation is performed using the consolidated performance metric values; and selecting by the higher level node the probable cause based on the performed correlation and the correlation results.

14. The method of claim 9, further comprising:

tracking application-dependency-mapping information for the application; and sending the application-dependency-mapping information to the higher-level node.

15. The method of claim 14, further comprising:

receiving, at the lower-level node, the distributed correlation request depending on whether the application dependency mapping information indicates a relationship between the higher-level node and the lower-level node.

16. The method of claim 14, further comprising:

pruning leaf nodes of the correlation graph depending on whether the received application-dependency-mapping information conflicts with the plurality of edges connecting the root node and the plurality of leaf nodes;

selecting a remaining leaf node, associated with a highly correlated metric, to be included in the correlation result.

17. A non-transitory computer readable storage medium having instructions stored thereon that, in response to execution by a computing device, cause the computing device to perform operations for performing distributed correlation in order to diagnose a root cause of anomalous behavior for a performance metric, the operations comprising:

triggering, by a local-level node that is implemented on one or more computing devices, an alert for a performance metric of an application executing on the local-level node, wherein the alert indicates anomalous behavior for the performance metric;

sending the alert to a higher-level node that is implemented on the one or more computing devices;

receiving a distributed correlation request from the higher-level node, wherein the distributed correlation request is initiated to determine a root cause of the alert;

constructing a correlation graph, the correlation graph including a root node representing the performance metric, a plurality of leaf nodes representing other performance metrics correlated with the performance metric, and a plurality of edges connecting the root node and the plurality of leaf nodes, each edge representing a dependent relationship between two performance metrics;

assigning a correlation strength to each of the plurality of edges;

selecting one or more of the plurality of leaf nodes to be included in a correlation result based on the correlation strength assigned to each of the plurality of edges connected to the plurality of leaf nodes; and sending the correlation result to the higher-level node, wherein the higher-level node is configured to select a probable cause of triggering the alert based on the performance metrics represented by the one or more leaf nodes included in the correlation result, and present the probable cause to a user.

* * * * *